United States Patent
Tucker et al.

(10) Patent No.: US 10,754,438 B2
(45) Date of Patent: Aug. 25, 2020

(54) FALSE TOUCH AND WATER DETECTION FOR TOUCH-SENSITIVE DISPLAYS

(71) Applicant: PARADE TECHNOLOGIES, LTD., Santa Clara, CA (US)

(72) Inventors: Jeffrey Tucker, Mill Creek, WA (US); Victor Paul Drake, Clyde Hill, WA (US); Jeffrey Jay Dahlin, Kenmore, WA (US); Kevin Ryan McNeely, Bothell, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 232 days.

(21) Appl. No.: 15/675,085

(22) Filed: Aug. 11, 2017

(65) Prior Publication Data

US 2018/0335889 A1 Nov. 22, 2018

Related U.S. Application Data

(60) Provisional application No. 62/507,105, filed on May 16, 2017.

(51) Int. Cl.
*G06F 3/041* (2006.01)
*G06F 3/044* (2006.01)
*G06F 3/01* (2006.01)

(52) U.S. Cl.
CPC ............ *G06F 3/018* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| | | | |
|---|---|---|---|
| 9,209,802 B1* | 12/2015 | Maharyta | H03K 17/955 |
| 2014/0362036 A1* | 12/2014 | Mo | G06F 3/044 345/174 |
| 2015/0049044 A1* | 2/2015 | Yousefpor | G06F 3/044 345/174 |
| 2015/0242051 A1* | 8/2015 | Ng | G06F 3/0418 345/174 |
| 2018/0307375 A1* | 10/2018 | Shah | G06F 3/0418 |

\* cited by examiner

*Primary Examiner* — Temesghen Gherbretinsae
*Assistant Examiner* — Ivelisse Martinez Quiles
(74) *Attorney, Agent, or Firm* — Morgan, Lewis & Bockius LLP

(57) ABSTRACT

The various implementations described herein include systems, methods and/or devices used to enable false touch detection. An exemplary method is performed at a touch-sensitive device and includes performing a plurality of scans of the touch-sensitive array during a time window, response data is captured from each of the plurality of scans. Distilling a value for each respective scan from the response data captured during the respective scan. Identifying a set of peaks from the distilled values, each peak having a plurality of characteristic values. The method further includes: (i) determining a metric for the peaks based on the plurality of characteristic values associated with each peak; (ii) determining whether the metric satisfies a criterion, and (iii) in response to determining that the metric satisfies the criterion, rejecting at least some of the response data captured during the time window as representing at least one false touch.

18 Claims, 8 Drawing Sheets

FALSE TOUCH AND WATER DETECTION FOR TOUCH-SENSITIVE DISPLAYS

RELATED APPLICATIONS

This application claims priority to U.S. Provisional Patent Application No. 62/507,105, filed May 16, 2017, which is hereby incorporated by reference in its entirety.

TECHNICAL FIELD

The disclosed implementations relate generally to touch-sensitive displays, and in particular, to false touch detection on a touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of touch sensing. A touch-sensitive system (e.g., capacitance sensing) may include a touch screen, touch-sensor pad, a touch-sensor slider, or touch-sensor buttons, and may include an array of one or more sensor elements. Touch sensing typically involves measuring, through sensor signals (e.g., increases or decreases in electrode responses), a change in capacitance associated with the sensor elements to determine a presence of an object relative to the sensor elements. However, when water contacts the touch screen, a touch may be improperly reported at the location of the water.

SUMMARY

Accordingly, there is a need for processes that allow the touch-sensitive system to differentiate a valid touch from a false touch (e.g., one caused by water). One solution to the problem is evaluating response data (e.g., electrode responses) over a period of time. For example, the touch-sensitive system may perform a plurality of scans of the touch screen (e.g., touch-sensitive array 202, FIG. 2) and capture response data during each of the plurality of scans. Using the captured response data, the touch-sensitive system may evaluate changes in the response data over a period of time (e.g., comparing response data from a first scan with response data from a second scan, and so on). In doing so, the touch-sensitive system may identify random behavior within the plurality of scans (e.g., chaotic behavior), which is indicative of water contacting the touch screen (e.g., a water spray).

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to differentiate a valid touch from a false touch.

(A1) Some implementations include a method of rejecting false touches (e.g., false touches caused by water contacting a touch-sensitive display). The method includes, at touch-sensitive device having one or more processors and a touch-sensitive array that includes a plurality of sensor electrodes, performing a plurality of scans of the touch-sensitive array during a time window, including capturing response data from each of the plurality of scans. The method further includes distilling a value for each respective scan of the plurality of scans from the response data captured during the respective scan and identifying a set of peaks from the distilled values, each peak having a plurality of characteristic values. The method further includes: (i) determining a first metric for the set of peaks based on the plurality of characteristic values associated with each peak in the set; (ii) determining whether the first metric satisfies a first criterion, and (iii) in response to determining that the first metric satisfies the first criterion, rejecting at least some of the response data captured during the time window as representing at least one false touch.

(A2) In some implementations of the method of A1, the method further includes, classifying each respective scan of the plurality of scans as either a first interaction type or a second interaction type, based at least in part on the response data captured during the respective scan. The method further includes determining a second metric for the plurality of scans based on an overall pattern of the first and second interaction types. The method further includes determining whether the second metric satisfies a second criterion and in response to determining that the second metric satisfies the second criterion, rejecting at least some of the response data captured during the time window as representing at least one false touch.

(A3) In some implementations of the method of any of A1-A2, classifying each respective scan includes comparing the response data with a plurality of response templates.

(A4) In some implementations of the method of any of A1-A3, the first interaction type is a valid touch (e.g., a user's finger, a stylus, etc.) and the second interaction type is a false touch (e.g., touch caused by water contacting the touch-sensitive display).

(A5) In some implementations of the method of any of A1-A4, distilling the value for each respective scan of the plurality of scans includes aggregating the response data captured during the respective scan for at least a subset of the plurality of sensor electrodes.

(A6) In some implementations of the method of any of A5, aggregating the response data captured during the respective scan includes determining an absolute sum of the response data for each sensor electrode in the subset.

(A7) In some implementations of the method of any of A1-A6, determining the first metric for the set of peaks based on the plurality of characteristic values includes: (i) determining a magnitude of each peak in the set and (ii) comparing the magnitude of each peak in the set with a threshold. Furthermore, in some implementations, determining whether the first metric satisfies the first criterion includes determining whether a predefined number of the magnitudes do not satisfy the threshold.

(A8) In some implementations of the method of any of A1-A7, determining the first metric for the set of peaks based on the plurality of characteristic values includes determining variances in peak magnitudes in the set peaks. In some implementations, determining variances in peak magnitudes in the set peaks includes forming baseline for the set of peaks using the distilled value for each peak in the set and determining a variance of each peak from the baseline. Furthermore, in some implementations, determining whether the first metric satisfies the first criterion includes determining whether the variances in peak magnitudes in the set of peaks satisfy a variance threshold.

(A9) In some implementations of the method of any of A1-A8, determining the first metric for the set of peaks based on the plurality of characteristic values includes determining a number of scans in a rising edge of each peak in the set. Furthermore, in some implementations, determining whether the first metric satisfies the first criterion includes comparing the number of scans in the rising edge of each peak in the set with a threshold.

(A10) In some implementations of the method of any of A1-A9, determining the first metric for the set of peaks based on the plurality of characteristic values includes determining a number of scans in a falling edge of each peak in the set. Furthermore, in some implementations, determining whether the first metric satisfies the first criterion includes comparing the number of scans in the falling edge of each peak in the set with a threshold.

(A11) In some implementations of the method of any of A1-A10, determining the first metric for the set of peaks based on the plurality of characteristic values includes: (i) determining a point in time, during the time window, in which each peak in the set occurred and (ii) determining a difference in time between each peak in the set. In some implementations, the first metric for the set of peaks is based on a degree of the difference in time between each peak in the set.

(A12) In some implementations of the method of any of A1-A11, the time window corresponds to a predetermined number of scans.

(A13) In some implementations of the method of any of A1-A12, performing the plurality of scans includes scanning the touch-sensitive array at a constant rate.

(A14) In some implementations of the method of any of A1-A13, the at least one false touch is caused by a drop, puddle, spray, rivulet, trail, or condensation of water.

(A15) In some implementations of the method of any of A1-A14, the method further includes, in response to determining that the first metric satisfies the criterion (e.g., either the first metric or the second metric satisfies the first criterion or the second criterion, respectively), rejecting response data captured during one or more subsequent scans of the touch-sensitive array. In some implementations, the rejected response data satisfies a touch threshold.

(A16) In some implementations of the method of any of A1-A15, the plurality of characteristic values includes one or more of: slope of rising edge, slope of falling edge, peak magnitude, variance in peak magnitude, spacing of peaks, uniformity of rising edge slopes, uniformity of falling edge slopes, implied acceleration between peaks.

(A17) In another aspect, a touch-sensitive device is provided (e.g., processing device 120, FIG. 1). The touch-sensitive device includes a touch-sensitive array that includes a plurality of sensor electrodes, one or more processors, and memory storing one or more programs, which when executed by the one or more processors cause the touch-sensitive device to perform the method described in any one of A1-A16.

(A18) In yet another aspect, a touch-sensitive device is provided and the touch-sensitive device (e.g., processing device 120, FIG. 1) includes means for performing the method described in any one of A1-A16.

(A19) In still another aspect, a non-transitory computer-readable storage medium is provided. The non-transitory computer-readable storage medium stores executable instructions that, when executed by the touch-sensitive device with one or more processors/cores, cause the touch-sensitive device to perform the method described in any one of A1-A16.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices used to reject false touches on a touch-sensitive array caused by water. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
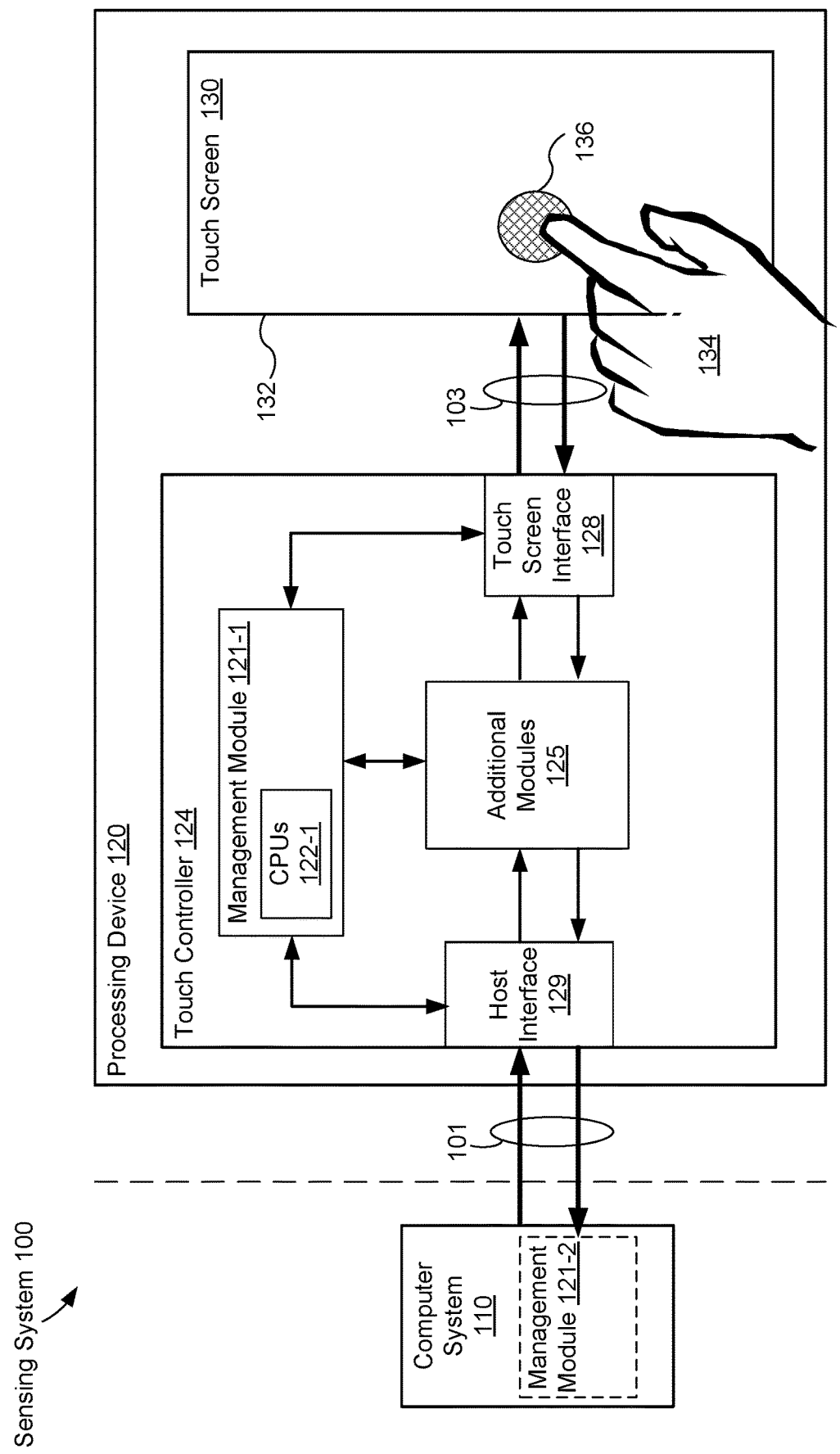
FIG. 1 is a block diagram illustrating a sensing system, in accordance with various implementations.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, the sensing system 100 includes a processing device 120 (also referred to herein as a touch-sensitive device), which includes a touch controller 124 and a touch screen 130 (also referred to herein a touch-sensitive display), and is used in conjunction with, or includes, a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input.

In some implementations, the processing device 120 includes a mobile device, such as a mobile phone or tablet computer. In some implementations, the processing device 120 includes a wearable device, such as a smart watch or bracelet. In some implementations, the sensing system 100 includes a mobile device or a wearable device. In some implementations, the processing device 120 may be part of various other touch-sensitive products (e.g., a bicycle computer, a navigation (e.g., global position system) device, a television, a remote control, a monitor, a handheld multimedia device, a handheld media (audio and/or video) player, a handheld gaming device, etc.).

In some implementations, non-volatile memory in the processing device 120 stores program instructions. In some implementations, the methods described herein are embodied in these program instructions. In some implementations, the processor 122-1 fetches and executes the program instructions. In some implementations, volatile memory (or non-volatile memory) is used to store data, including response data captured during a plurality of scans of the touch screen 130 (discussed below). In some implementations, a touch interface 128 acts as an interface between the touch screen 130 and the processor device 120. In some implementations, under control of the processor 120, the touch interface 128 scans the touch panel and generates response data (e.g., raw sensor data) from the touch screen 130.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, connections 103 convey raw sensor data (e.g., response data) and/or control signals. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch-sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger or a stylus).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., memory 306, FIG. 3). In some implementations, the memory module stores detected electrode responses (e.g., response data), electrode response criteria, previously determined baselines, previously determined metrics, response templates, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

In some implementations, the processing device 120 resides on a common carrier substrate such as, for example, an integrated circuit ("IC") die substrate, a multi-chip module substrate, or the like. In some implementations, the components of the processing device 120 may be one or more separate integrated circuits and/or discrete components. In some implementations, the processing device 120 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

Figure 2:
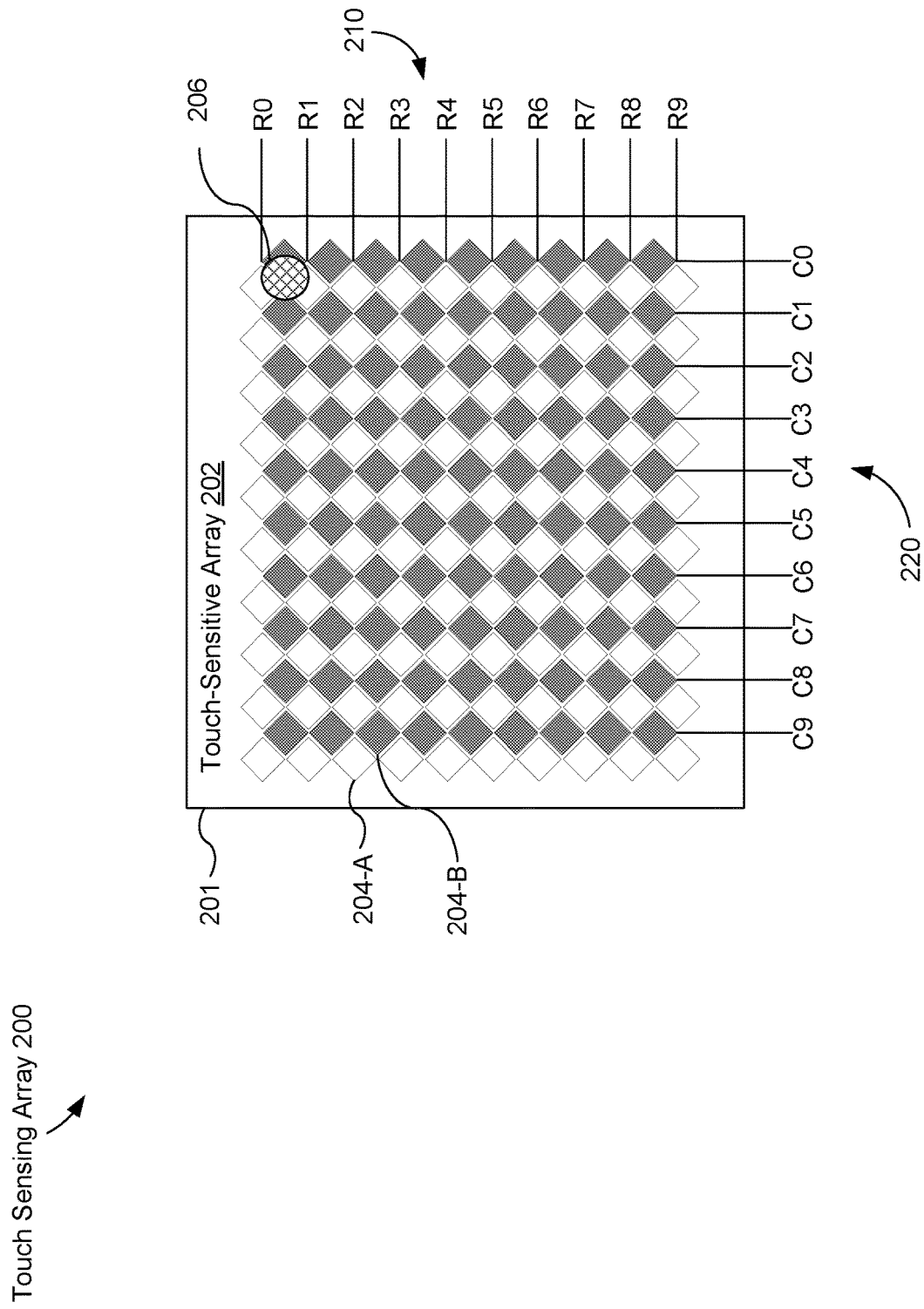
FIG. 2 is a diagram illustrating a touch-sensing array (e.g., a touch screen), in accordance with various implementations.

FIG. 2 is a diagram illustrating a touch-sensing array 200 (e.g., touch screen 130, FIG. 1) including a substrate 201 (e.g., a dielectric material) having a touch-sensitive array 202 (e.g., sensing array 132, FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., management module 121-1, FIG. 1). In the operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the touch-sensitive array 202 (e.g., a capacitance sense array), each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module can determine a location (e.g., touch location 136, FIG. 1) of a touch 206 on the touch-sensitive array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

It should also be understood that although the touch-sensitive array 202 illustrated includes a same number of rows and columns, the touch-sensitive array 202 optionally includes a different number of rows and columns (e.g., 10 rows and 5 columns). Moreover, although the touch-sensitive array 202 illustrated includes a same number of elements in each column of C0-C9 220, the touch-sensitive array 202 optionally includes different numbers of sense elements in each column, or in a subset of the columns. For example, in one implementation, C0 consists of 10 elements, C1 consists of 8 elements, C2 consists of 10 elements, C3 consists of 12 elements, C4 consists of 10 elements, C5 consists of 15 elements, and so on. Similarly, the touch-sensitive array 202 optionally includes different numbers of elements in each row, or in a subset of the rows.

In addition, the touch-sensitive array 202 may take many forms known by those skilled in the art. For example, the touch-sensitive array 202 may have rows and columns specifically designed for self-capacitance sensing, mutual-capacitance sensing, or a combination of the two. In addition, although not shown, the touch-sensitive array 202 may be a self-capacitance multi-pad array, at least in some implementations.

In some implementations, a processing device (e.g., processing device 120, FIG. 1) or one or more components of the processing device (e.g., management module 121-1, FIG. 1) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode (e.g., sensor electrode 204-A) increases capacitance at the specific sensor electrode because the finger's capacitance is added to the capacitance of the specific sensor electrode. The processing device detects a "touch" when the added capacitance to the specific sensor electrode satisfies a predefined threshold. Alternatively, water (e.g., rain droplets, sweat spray, etc.) at one or more sensor electrodes (e.g., sensor electrode 204-A) may also increase (or decrease) capacitance at the one or more sensor electrodes. As such, the processing device may detect a "touch" caused by water when the added capacitance to the specific sensor electrode satisfies the predefined threshold. In other words, the processing device may improperly report a touch in some circumstances.

In some implementations, the processing device measures capacitance of the plurality of sensor electrodes 204 using mutual-capacitance sensing. In some implementations, mutual-capacitance sensing measures capacitance between a column electrode (e.g., a transmit (TX) electrode), and a row electrode (e.g., a receive (RX) electrode). For example, mutual-capacitance sensing measures a change (e.g., a decrease or increase) in capacitance between the column electrode (e.g., sensor electrode 204-A) and the row electrode (e.g., sensor electrode 204-B) resulting from a user's touch (e.g., a finger). Again, water (e.g., rain droplets, sweat spray, etc.) may cause measurable changes in mutual-capacitance. Furthermore, in some circumstances, the touch-sensitive device may include a metal bezel (e.g., a metal bezel around a perimeter of a wearable device), which may ground water located on the touch-sensitive display. In these circumstances, the measurable changes caused by water are greater (e.g., a decrease or increase), resulting in electrode responses that substantially mirror electrode responses caused by a user's finger.

Figure 3:
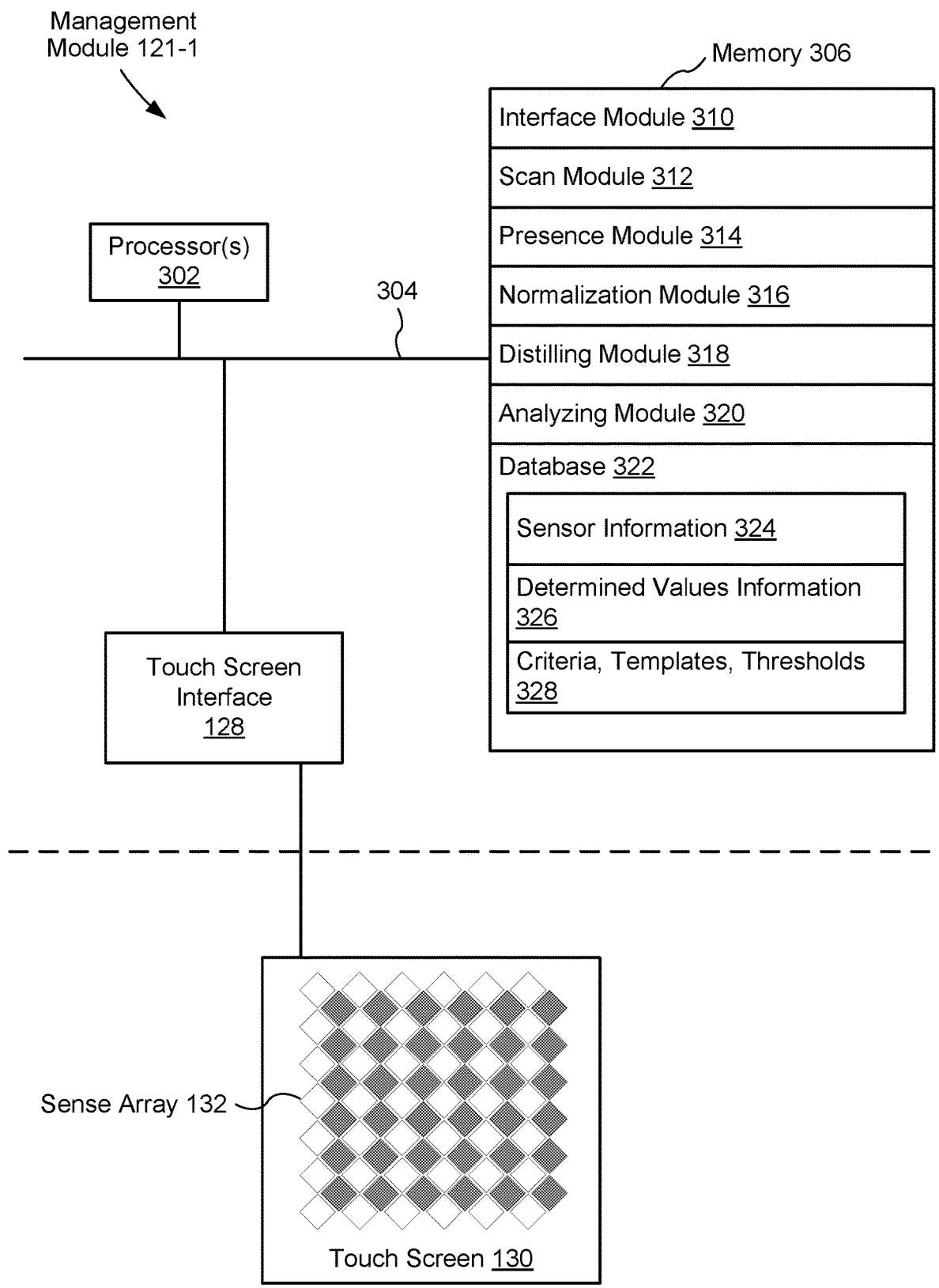
FIG. 3 is a block diagram illustrating an implementation of a touch-sensitive device, in accordance with some implementations

FIG. 3 is a block diagram illustrating an implementation of a management module 121-1 (FIG. 1). The management module 121-1 typically includes one or more processing units 302 (sometimes herein called CPUs, processors, or hardware processors, and sometimes implemented using microprocessors, microcontrollers, or the like) for executing modules, programs and/or instructions stored in memory 306 and thereby performing processing operations, memory 306 and one or more communication buses 304 for interconnecting these components. The communication buses 304 optionally include circuitry (sometimes called a chipset) that interconnects and controls communications between system components. In some implementations, the management module 121-1 is coupled to a touch screen (e.g., touch screen 130, FIG. 1, and in turn, sense array 132) by the communication buses 304 and the touch screen interface 128. In some implementations, the memory 306, or the computer readable storage medium of the memory 306 stores the following modules and data used by the modules:

an interface module 310 that is used for communicating with other components of the touch-sensitive device;

a scan module 312 that is used for scanning the sense array 132 and for converting sensor signals (e.g., convert analog signals, such as voltage and/or change, into digital signals, or vice versa);

a presence module 314 that is used for detecting presence of an object (e.g., a user's finger, a stylus, a liquid, etc.), or lack of an object. In some implementations, the presence module 314 obtains response data (e.g., electrode response data) when detecting the presence of the object;

a normalization module 316 that is used for normalizing electrode responses from the touch-sensitive array;

a distilling module 318 that is used for distilling a value from response data captured by the presence module 314. In some implementations, distilling a value from the response data includes aggregating response data captured during a respective scan (e.g., a single frame); and an analyzing module 320 that is used for analyzing response data and values distilled by the distilling module 318 (e.g., evaluating relationship between a plurality of distilled values); and database 322, including but not limited to:

sensor information 324 for storing and managing response data received, detected, and/or transmitted by one or more sensor electrodes of the touch-sensitive array;

determined values information 326 for storing and managing values distilled by the distilling module 318 and other values determined by the analyzing module 320 (e.g., interaction types, metrics, etc.); and criteria (e.g., shape and chaos criteria), templates (e.g., plurality of response templates), and thresholds 328 (e.g., response thresholds, threshold periods of time, etc.).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

In some implementations, the analyzing module 320 determines one or more characteristics associated with response data captured during one or more scans of the sense array 132. In some implementations, the analyzing module 320 uses the one or more characteristics to determine one or more metrics for the response data. In some implementations, a metric is determined for a plurality of scans (e.g., a single metric is assigned to a group of scans). In some implementations, a metric is determined for individual scans. Determining metrics is discussed in further detail below with reference to method 600.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores one or more water detection algorithms, determined metrics, and other relevant information. In some implementations, the programs, modules, and data structures stored in memory 306, or the computer-readable storage medium of the memory 306, provide instructions for implementing respective operations in the methods described below with reference to FIG. 6.

Figure 4A:
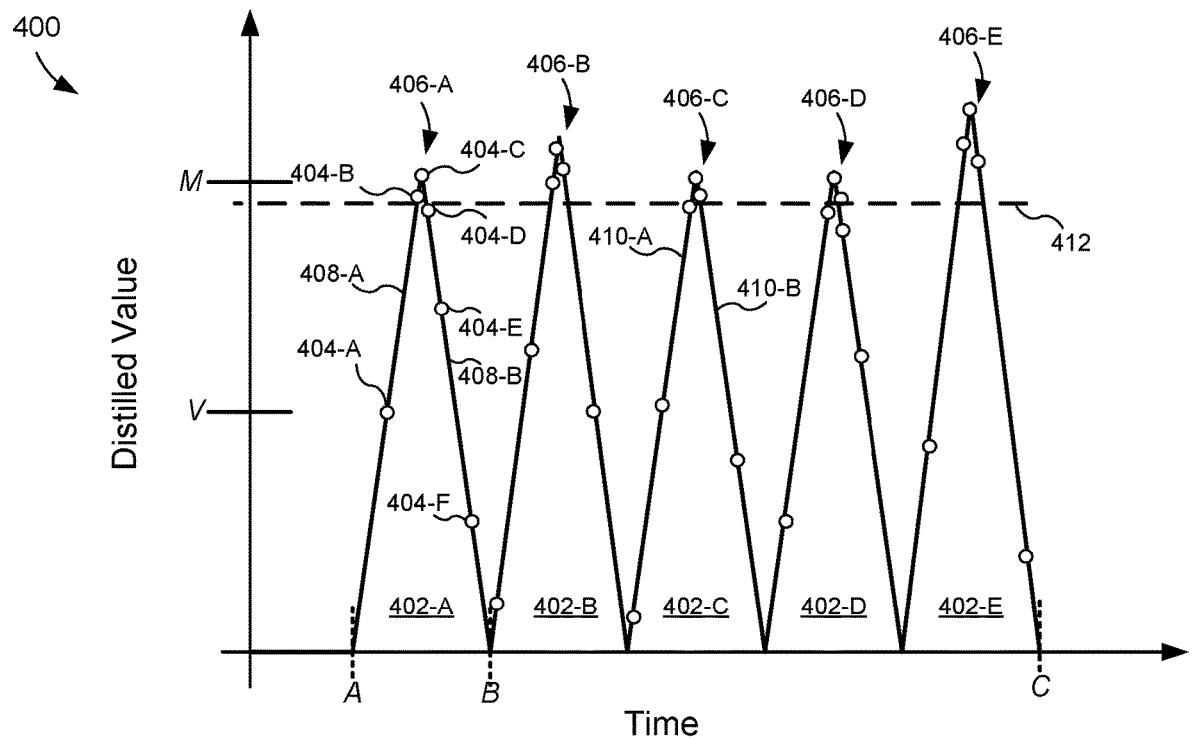
FIGS. 4A-4B illustrate prophetic diagrams of response data captured during a plurality of scans of a touch-sensitive display, in accordance with some implementations.

FIG. 4A is a prophetic diagram 400 of response data captured during a plurality of scans of a touch-sensitive display, in accordance with some implementations. In particular, FIG. 4A illustrates distilled values resulting from five sequential touches on the touch-sensitive display by a user (e.g., a user typing a five character message, such as an email, text message, etc.). The touch-sensitive display (e.g., touch screen 130, FIG. 1) includes a touch-sensitive array (e.g., sense array 132, FIG. 1; touch-sensitive array 202, FIG. 2). The touch-sensitive array includes a plurality of sensor electrodes (e.g., sensor electrodes 204-A and 204-B, etc., FIG. 2). The X-axis designates "Time" while the Y-axis designates "Distilled Values" (e.g., magnitude of distilled values) from response data captured during a plurality of scans. A "distilled value" is a value used to characterize response data captured during a respective scan of the touch sensitive array (discussed in more detail below).

Figure 4B:
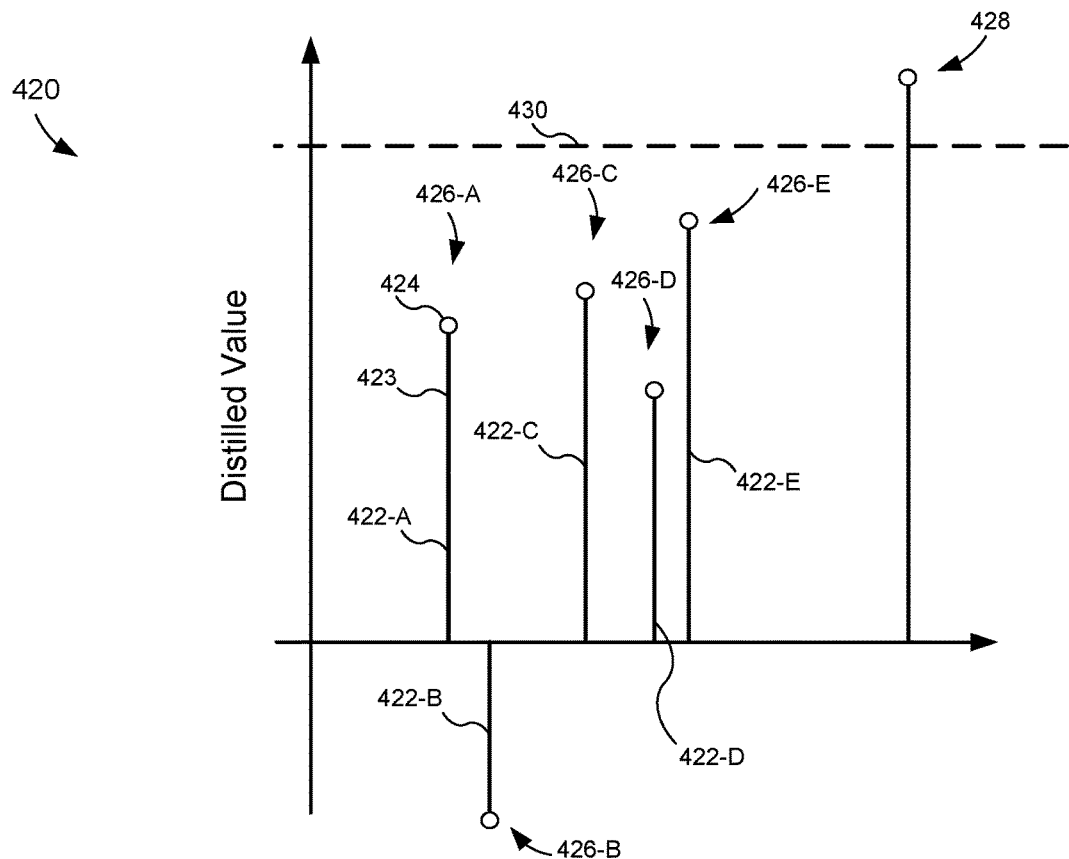

The prophetic diagram 400 includes a plurality of potential touch events 402-A, 402-B, 402-C, 402-D, and 402-E detected during the plurality of scans of the touch-sensitive array. Each of the plurality of potential touch events correspond to one of the five sequential touches on the touch-sensitive array by the user. For example, as the user types a five character word (e.g., the word "Field"), each potential touch event corresponds to one of the characters in the word (e.g., touch event 402-A corresponds to the "F," touch event 402-B corresponds to the "I," and so on). As shown, the potential touch events are uniformly distributed (e.g., peak height is substantially uniform, time between peaks is substantial uniform, slope of rising and falling edges is substantially uniform, etc.). A uniform distribution of potential touch events correlates to minimal chaos in the sensing system whereas an erratic distribution of potential touch events correlates to significant chaos in the sensing system (e.g., when water contacts the touch-sensitive display, as shown in FIG. 4B, the result is erratic and chaotic).

In some implementations, each of the potential touch events includes a plurality of distilled values (e.g., distilled values 404-A, 404-B, etc. are associated with potential touch event 402-A). Each of the distilled values corresponds to response data (e.g., electrode responses) captured during one of the plurality of scans (i.e., a distilled value represents one frame of data). In some implementations, the touch-sensitive device (processing device 120, FIG. 1) may determine a distilled value by aggregating response data captured during a respective scan (e.g., a single frame) of the plurality of scans. The aggregating may be an absolute sum of the response data for each sensor electrode (or each pair of sensor electrodes) in the touch-sensitive array. For example, with reference to the distilled value 404-A, a first sensor electrode (or a first pair of sensor electrodes) in the touch-sensitive array may have response data of (−X), a second sensor electrode (or a second pair of sensor electrodes) may have response data of (Y), and an ninth sensor electrode (or an ninth pair of sensor electrodes) may have response data of (K). The absolute sum for these sensor electrodes would be (−1(−X))+(Y)+ . . . (K)=Distilled Value (V) (i.e., a positive sum). In some implementations, the touch-sensitive device may determine a distilled value by determining one or more statistics for the response data (e.g., a mean electrode response, a median electrode response, a mode electrode response, etc.).

To further illustrate, potential touch event 402-A includes the distilled values 404-A, 404-B, 404-C, 404-D, 404-E, and 404-F. The potential touch event 402-A includes multiple distilled values because the touch-sensitive device 120 scans the touch-sensitive array at a rate that is substantially greater than a rate/speed at which a user can touch the touch-sensitive display. For example, the potential touch event 402-A begins at point in time A and ends at point in time B. During the time frame between A and B, the processing device scans the touch-sensitive array six times. As such, at least when a finger touch is involved, the processing device 120 can expect a potential touch event to include multiple distilled values (i.e., more than a threshold amount of distilled values). Furthermore, the number of distilled values can be broken into two groups: (i) rising edge distilled values and (ii) falling edge distilled values. In some implementations, the processing device evaluates the rising edge distilled values separately from the falling edge distilled values. Alternatively, in some implementations, the processing device evaluates the rising edge distilled values in combination with the falling edge distilled values. The number of distilled values for the potential touch events shown in FIG. 4A is merely illustrative. One skilled in the art will appreciate that a potential touch event may include various numbers of distilled values, depending on the circumstances. Evaluating rising and falling edges is discussed in further detail below with reference to FIG. 6.

Each of the potential touch events includes a peak, thereby forming a set of peaks (e.g., peaks 406-A, 406-B, 406-C, 406-D, and 406-E are each associated with a respective potential touch event). Each peak in the set corresponds to a maximum distilled value for a respective potential touch event. For example, as the user types a five character word (e.g., the word "Field"), each peak in the set corresponds to a point in time when the user's finger maximized contact with the touch-sensitive display (e.g., a point in time when the user's finger maximized contact while typing "F," another point in time when the user's finger maximized contact while typing "I," and so on). The gradually incline (and decline) from distilled value to distilled value results from fingers being malleable and also the slow, yet constant rate at which user's move their fingers (e.g., "slow" when compared to the rate at which the processing device is scanning the touch-sensitive array).

In some implementations, the set of peaks is limited to a predefined number of peaks (e.g., five peaks). Accordingly, the set of peaks is continually being updated, meaning that an oldest peak in the set is removed to make room for a new peak (e.g., if a first set of peaks includes peaks 1, 2, 3, 4, and 5, then a second set of peaks includes peaks 2, 3, 4, 5, and 6, where peak 1 is removed to make room for peak 6).

FIG. 4B is a prophetic diagram 420 of response data captured during a plurality of scans of a touch-sensitive display, in accordance with some implementations. In particular, FIG. 4B illustrates distilled values resulting from liquid (e.g., water, sweat, etc.) contacting the touch-sensitive display. Water may take many forms on a touch screen, such as a drop, puddle, spray, rivulet, trail, condensation, etc. In addition, if water (e.g., salt water) on the touch-sensitive display becomes grounded (e.g., via a metal bezel of the device), the resulting electrode responses can substantial mirror electrode responses from finger touches. Accordingly, the processing device compares values distilled from a plurality of scans to differentiate false touch caused by water (as shown in FIG. 4B) from legitimate touch events (as shown in FIG. 4A).

The prophetic diagram 420 includes a plurality of potential touch events 422-A, 422-B, 422-C, 422-D, 422-E detected during a plurality of scans of the touch-sensitive array, which correspond to liquid contacting the touch-sensitive display. As shown, the potential touch events are not uniformly distributed (e.g., peak height is erratic, time between peaks is erratic, etc.). An erratic distribution of potential touch events correlates to chaos in the sensing system. Based on the erratic distribution, the processing device can estimate that a potential touch event in FIG. 4B is a false touch, e.g., caused by water (discussed in more detail below).

Each of the potential touch events includes at least one distilled value. For example, the potential touch event 422-A includes a single distilled value 424. The potential touch events shown in FIG. 4B include a minimal amount of distilled values because the processing device 120 scans the touch-sensitive array at a rate that is substantially similar to a rate/speed at which water spray contacts the touch-sensitive display. As such, at least when water is involved, the processing device 120 can expect a potential touch event to include a minimal amount of distilled values (i.e., less than a threshold amount of distilled values). The number of distilled values for the potential touch events shown in FIG. 4B is merely illustrative. One skilled in the art will appreciate that a potential touch event caused by water can include various numbers of distilled values, depending on the circumstances.

Each of the potential touch events includes a peak, thereby forming a set of peaks (e.g., peaks 426-A, 426-B, 426-C, 426-D, and 426-E). Each peak in the set corresponds to a maximum distilled value associated with a potential touch event. For example, when water contacts the touch-sensitive display, each peak in the set corresponds to a point in time when the water maximized contact with the touch-sensitive display. The steep increase (and decrease) from distilled value to distilled value results from water contacting the display (and moving about the display) at a substantially similar rate to the rate at which the processing device scans the touch-sensitive array (as discussed above).

Each peak in FIGS. 4A-4B includes a plurality of characteristic values, which are determined from the distilled values associated with the peak. In some implementations, the processing device evaluates characteristics for a given peak in isolation. Alternatively, in some implementations, the processing device evaluates characteristics between peaks. The plurality of characteristics may include, without limitation, a slope of the rising edge (e.g., rising edge slope 408-A associated with distilled values 404-A, 404-B, and 404-C); a slope of the falling edge (e.g., falling edge slope 408-B associated with distilled values 404-C, 404-D, 404-E, and 404-F); uniformity in rising edge slopes (e.g., comparing rising edge slopes of one or more peaks in the set); uniformity in falling edge slopes (e.g., comparing falling edge slopes of one or more peaks in the set); peak magnitude (e.g., magnitude (M)); location/spacing of peaks (e.g., peak 406-A is at t1, peak 406-B is at t2, etc., FIG. 5A); variance in peak magnitude, among others.

In some implementations, the processing device determines one or more metrics from the set of peaks (e.g., peaks 402-A-402-F) based on the plurality of characteristics. The one or more metrics indicate a degree of chaos associated with the set of peaks. For example, one or more metrics for the set of peaks in FIG. 4A would indicate a first degree of chaos, and one or more metrics for the set of peaks in FIG. 4B would indicate a second degree of chaos, the second degree of chaos being greater than the first degree of chaos. Determining metrics is discussed in further detail below with reference to method 600.

Figure 5A:
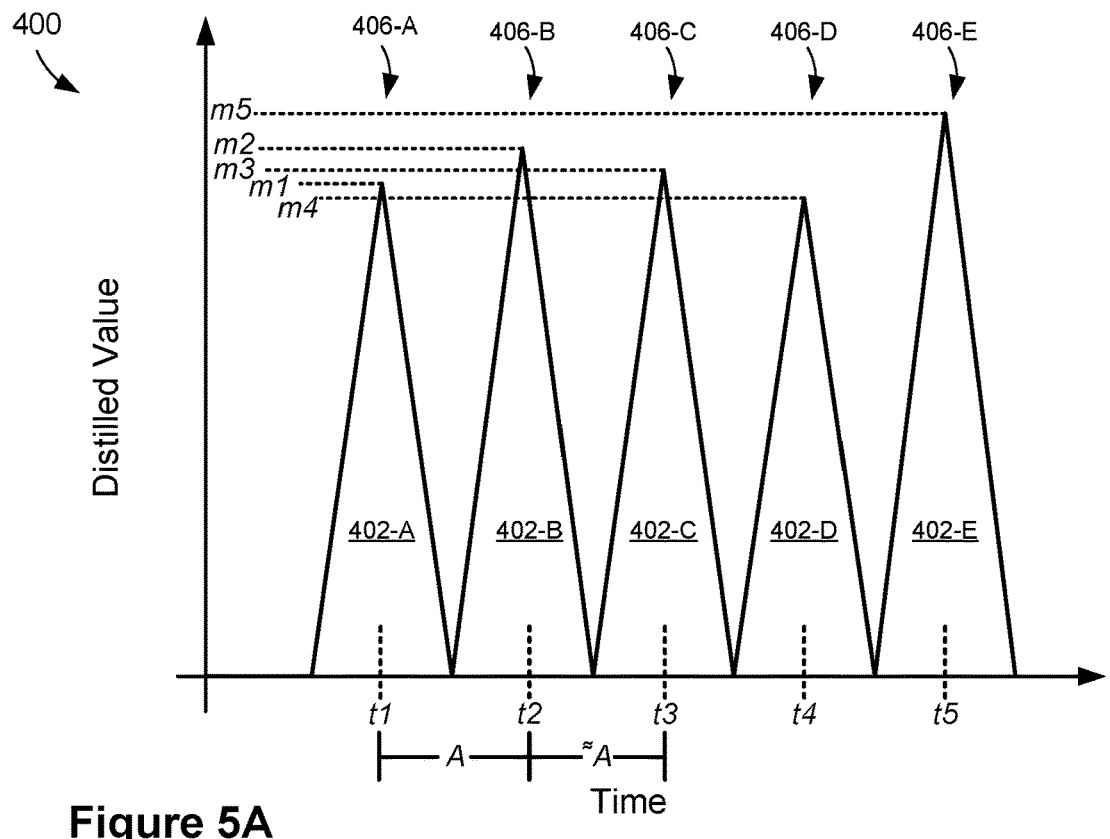
FIGS. 5A-5B illustrate prophetic diagrams of response data captured during a plurality of scans of a touch-sensitive display, in accordance with some implementations.
Figure 5B:
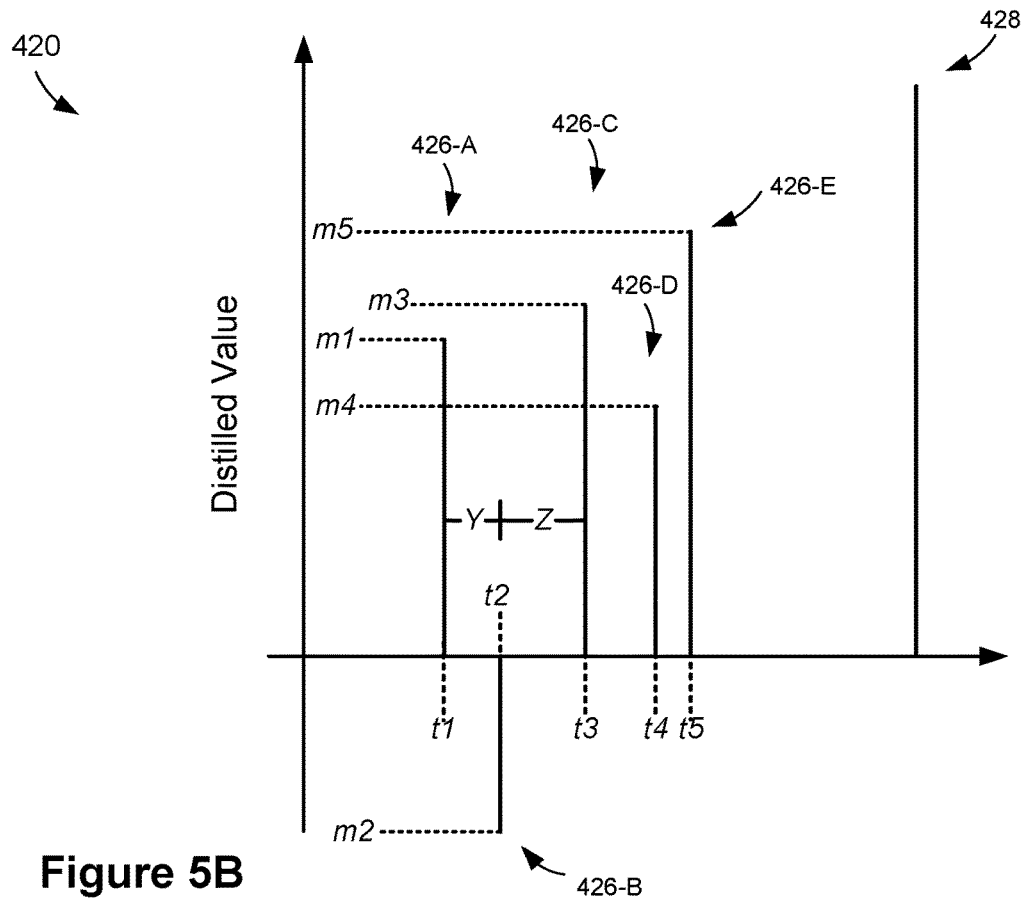

FIGS. 5A-5B further illustrate the prophetic diagrams described above with reference to FIGS. 4A-4B. However, for ease of illustration and discussion, certain elements have been replaced with other elements. In particular, FIGS. 5A-5B illustrate (i) variance in peak magnitude and (ii) variance in peak spacing/location. These aspects of FIGS. 5A-5B are discussed in further detail below with reference to method 600.

Figure 6:
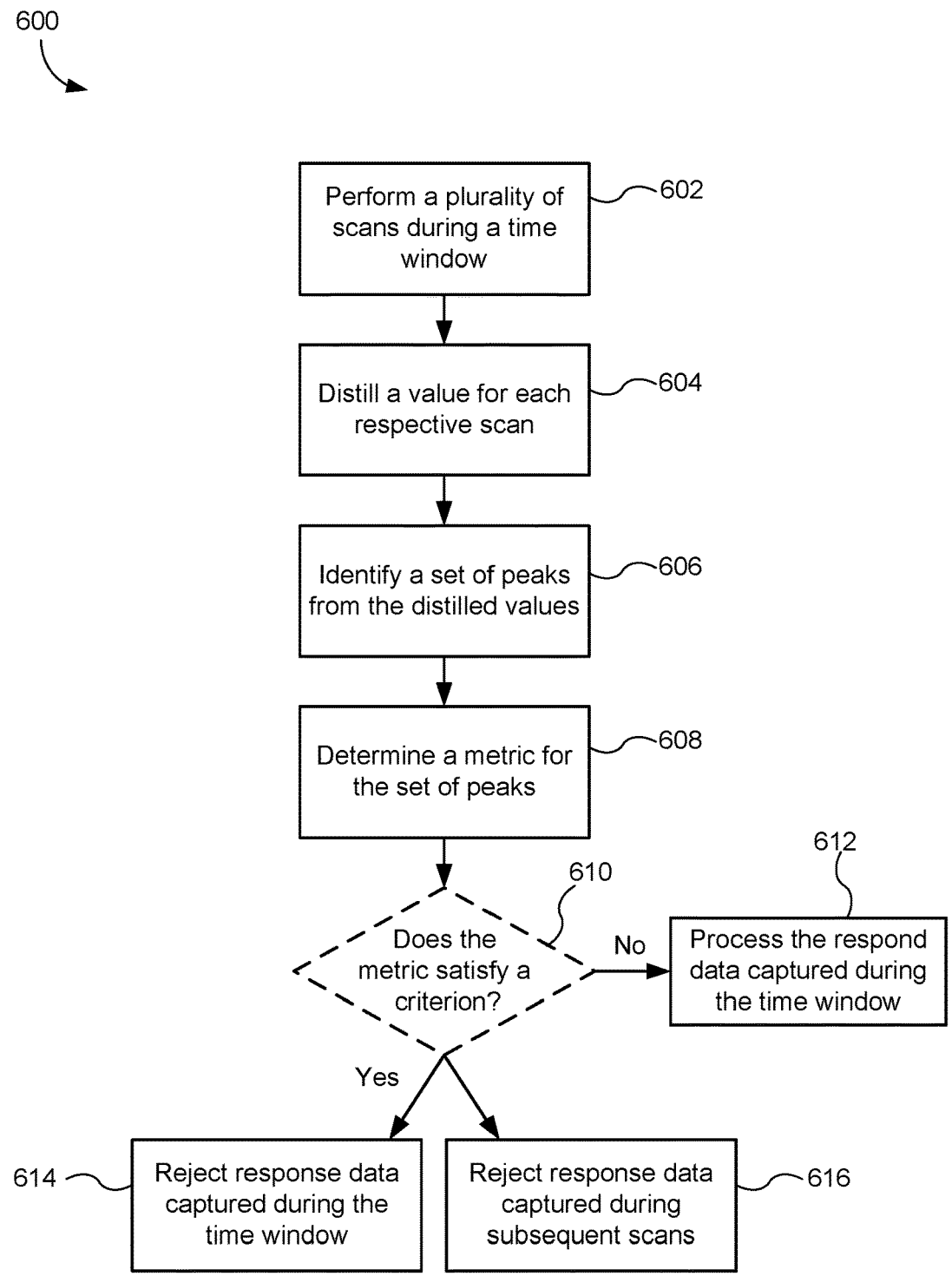
FIG. 6 provides a conceptual flowchart of a method of false touch detection on a touch-sensitive array, in accordance with some implementations.

FIG. 6 provides a conceptual flowchart of false touch detection for touch-sensitive displays, in accordance with some implementations. In some implementations, a method 600 is performed by a touch-sensitive device (e.g., processing device 120, FIG. 1) or one or more components of the processing device (e.g., touch controller 124). In some implementations, the method 600 is governed by instructions that are stored in a non-transitory computer-readable storage medium, which are executed by one or more processors of the touch-sensitive device, such as the one or more processing units (CPUs) 122-1 of management module 121-1 (FIG. 1). In some implementations, some of the operations (or alternatively, steps) of method 600 are performed at a host system (e.g., computer system 110) that is operatively coupled with the touch-sensitive device 120 and other operations of method 600 are performed at the touch-sensitive device 120.

For ease of explanation, the method 600 is performed by the processing device 120. With reference to FIG. 3, in some implementations, the operations of method 600 are performed, at least in part, by a scan module (e.g., scan module 312, FIG. 3), a presence module (e.g., presence module 314, FIG. 3), a normalization module (e.g., normalization module 316, FIG. 3), a distilling module (e.g., distilling module 318, FIG. 3), and an analyzing module (e.g., analyzing module 320, FIG. 3), or a program that embodies one or more functions of these modules. To assist with describing the method 600, the method 600 will be described with reference to the prophetic diagrams illustrated in FIGS. 4A-4B, 5A-5B, and 7A-7B.

In performing the method 600, the processing device performs (602) a plurality of scans of a touch-sensitive array (e.g., touch-sensitive array 202, FIG. 2) during a time window (e.g., between point in time A and point in time B, FIG. 4A). The processing device captures response data during each of the plurality of scans (i.e., during each frame). In some implementations, the processing device uses self-capacitance measurements to capture the response data. Alternatively or in addition, in some implementations, the processing device uses mutual-capacitance measurements to capture the response data. In some implementations, the time window corresponds to a predetermined number of scans (e.g., 100 scans, or some greater (or lesser) number of scans). In some implementations, performing the plurality of scans includes scanning the touch-sensitive array at a constant rate (e.g., scanning at 100 scans per second, or some greater (or lesser) rate). In some implementations, the time window corresponds to a number of peaks (e.g., a set of five peaks, or some greater (or lesser) number of peaks).

In some implementations, the processing device distills (604) a value for each respective scan of the plurality of scans from the response data captured during the respective scan. Alternatively, in some implementations, the processing device distills a value for specific scans of the plurality of scans (e.g., for every third scan, distill a value). In some implementations, to distill the value for a respective scan (604), the processing device aggregates the response data (e.g., sensor electrode responses) captured during the respective scan for at least a subset of the plurality of sensor electrodes. For example, the processing device adds electrode responses to obtain the distilled value for the respective scan. In another example, the processing device determines an absolute sum of the response data for each sensor electrode in the subset (or the entire array). Distilling values is discussed in further detail above with reference to FIG. 4A.

In some implementations, the processing device limits the distilling to certain sensor electrodes in the touch-sensitive array (e.g., to save time and energy). For example, the processing device may determine that a subset of the touch-sensitive array is active (i.e., changes in sensor electrode responses is limited to a certain area of the touch screen). In response, the processing device limits distilling to the subset. In this way, the processing device avoids processing unnecessary portions of the touch-sensitive array.

In some implementations, the processing device identifies (606) a set of peaks from the distilled values. The peaks in the set have a plurality of characteristic values (e.g., a first peak may have a first plurality of characteristics, a second peak may have a second plurality of characteristics, and so on). In some implementations, the processing device evaluates the distilled values (e.g., distilled values 404-A, 404-B, 404-C, 404-D, 404-E, and 404-F) to determine the plurality of characteristic values.

In some implementations, a peak is a maximum distilled value associated with a potential touch event. For example, referring to FIG. 4A, potential touch event 402-A includes a plurality of distilled values 404-A, 404-B, 404-C, 404-D, 404-E, and 404-F. Out of these, distilled value 404-C has the maximum distilled value (M), and is therefore one of the peaks in the set.

In some implementations, the processing device determines (608) a metric (also referred to herein as a first metric and/or a chaos metric) for the set of peaks based on the plurality of characteristic values associated with each peak in the set. The processing device then determines (610) whether the chaos metric satisfies a criterion (also referred to herein as a first criterion and/or a chaos criterion). For example, a chaos metric for the set of peaks in FIG. 4A indicates a first degree of chaos, and a chaos metric for the set of peaks in FIG. 4B indicates a second degree of chaos, the second degree of chaos being greater than the first degree of chaos. The chaos criterion is set such that erratic peak distributions, such as the peak distribution shown in FIG. 4B, satisfy the chaos criterion.

In some implementations, one of the characteristic values is peak magnitude. Accordingly, in some implementations, to determine the chaos metric for the set of peaks (608), the processing device (i) identifies a magnitude (e.g., maximum distilled value 404-C, FIG. 4A) of each peak in the set and (ii) compares the magnitude of each peak in the set with a response threshold (e.g., compares maximum distilled value 404-C to response threshold 412, FIG. 4A). The chaos metric corresponds to a number of peaks that satisfy the response threshold (e.g., an increase in the number of peaks in the set satisfying the response threshold results in a decrease of the chaos metric).

In some implementations, in determining whether the chaos metric satisfies the chaos criterion (610), the processing device determines whether a predefined number of the magnitudes in the set of peaks do not satisfy the response threshold. For example, referring to FIG. 4A, peak 406-A of potential touch event 402-A has a distilled value 404-C with a magnitude (M). The magnitude (M) of the distilled value 404-C is greater than the response threshold 412. Accordingly, peak 406-A is counted towards the predefined number. The processing device repeats this process for the other peaks in the set. For example, peaks 406-B, 406-C, 406-D, 406-E each have a distilled value with a magnitude that is greater than the response threshold 412. As such, assuming that five peaks satisfies the predefined number, the chaos metric associated with the set of peaks in FIG. 4A would not satisfy the chaos criterion (i.e., there is minimal chaos). In some implementations, when at least half of the magnitudes in the set of peaks satisfy the response threshold, the chaos metric associated with the set of peaks does not satisfy the chaos criterion.

In contrast, now referring to FIG. 4B, none of the peaks in the set 426-A, 426-B, 426-C, 426-D, and 426-E have a distilled value with a magnitude that is greater than or equal to the response threshold 430. As such, the chaos metric associated with the set of peaks in FIG. 4B satisfies the chaos criterion (i.e., processing device assumes there is substantial chaos due to none of the peaks satisfying the response threshold 430).

In some implementations, one of the characteristic values is peak variance. Accordingly, in some implementations, to determine the chaos metric for the set of peaks (608), the processing device determines variances of peak magnitudes in the set peaks. In some implementations, the processing device determines the variances of peak magnitudes in addition to comparing the magnitude of each peak in the set with the response threshold. In some implementations, the processing device determines a variance in peak magnitude between adjacent peaks in the set of peaks. The processing device may set the chaos metric in accordance with a degree of variance in peak magnitudes in the set of peaks (e.g., a low degree of variance in the set of peaks results in a decrease of the chaos metric). For example, referring to FIG. 5A, peak 406-A has a magnitude of m1, peak 406-B has a magnitude of m2, peak 406-C has a magnitude of m3, peak 406-D has a magnitude of m4, and peak 406-E has a magnitude of m5. Although some variance exists between peaks (e.g., there is a difference between m1 and m2, m1 and m3, and so on), the degree of variance is minimal (at least with respect to a degree of variance shown in FIG. 5B). FIG. 5B illustrates a high degree of variance in peak magnitudes. The high degree of variance is attributable to the randomness at which water contacts the touch-sensitive display. For example, water spray contacting the touch-sensitive display may include water droplets of different shape and size, different properties (e.g., different concentrations of minerals, salinity, etc.), and some droplets may combine on the touch-sensitive display and/or run across the touch-sensitive display.

In some implementations, the processing device aggregates the determined variances and sets the chaos metric in accordance with the aggregation. For example, referring to FIGS. 5A-5B, the processing device calculates (m2−m1), +(m3−m2), and so on. Larger aggregations lead to higher chaos metrics.

In some implementations, the processing device normalizes peak magnitudes prior to evaluating variance between peak magnitudes (e.g., normalize aggregation of peak variances based on magnitudes of one or more peaks in the set). In some implementations, the processing device determines a baseline prior to evaluating variance between peak magnitudes. For example, the processing device may calculate one or more statistics for the baseline such as an average peak magnitude, a median peak magnitude, a mode peak magnitude, or some other statistic. In some implementations, the processing device determines the variances of peak magnitudes in the set peaks by determining a variance of each peak magnitude from the baseline.

In some implementations, in determining whether the metric satisfies the chaos criterion (610), the processing device determines whether the variances of peak magnitudes for the set of peaks satisfy a variance threshold. For example, the processing device determines whether a variance in peak magnitude between a first pair of adjacent peaks satisfies the variance threshold, whether a variance in peak magnitude between a second pair of adjacent peaks satisfies the variance threshold, and so on. In another example, the processing device may determine whether the aggregation of the variances of peak magnitudes (e.g., variances between m1, m2, m3, m4, and m5, FIGS. 5A-5B) for the set of peaks satisfies the variance threshold.

In some implementations, one of the characteristic values is slope of the rising edge. Accordingly, in some implementations, to determine the chaos metric for the set of peaks (608), the processing device determines a number of scans in a rising edge of each peak in the set (e.g., determines a slope). The processing device may set the chaos metric in accordance with the number of scans in the rising edge (e.g., an increase in the number of scans in the rising edge results in a decrease of the chaos metric, at least to a certain extent). For example, referring to FIG. 4A, a rising edge 408-A of the potential touch event 402-A includes three distilled values 404-A, 404-B, and 404-C from three scans, which results in a decreased chaos metric. In contrast, referring to FIG. 4B, a rising edge 423 of the potential touch event 422-A includes a single distilled value 424, which results in an increased chaos metric.

In some implementations, in determining whether the chaos metric satisfies the chaos criterion (610), the processing device compares the number of scans in the rising edge of each peak in the set with a threshold number of scans. For example, referring again to FIG. 4A, the processing device may compare the three scans (e.g., distilled values 404-A, 404-B, and 404-C) in the rising edge 408-A of the potential touch event 402-A with the threshold number of scans. If the number of scans in the rising edge of a respective peak satisfies the threshold number of scans, then the respective peak does not satisfy the chaos criterion and the processing device associates the respective peak (e.g., peak 406-A of potential touch event 402-A) with a touch. If the number of scans in the rising edge of a respective peak does not satisfy the threshold number of scans, then the respective peak satisfies the chaos criterion and the processing device associates the respective peak with a false touch (e.g., water, sweat spray, etc.). Although three scans are discussed above with reference to the threshold number of scans, any number of scans can be used for the threshold number of scans.

In some implementations, one of the characteristic values is slope of the falling edge. Accordingly, in some implementations, to determine the chaos metric for the set of peaks (608), the processing device determines a number of scans in a falling edge of each peak in the set (e.g., determines a slope). The processing device may set the chaos metric in accordance with the number of scans in the falling edge (e.g., an increase in the number of scans in the falling edge results in a decreased chaos metric). For example, referring to FIG. 4A, a falling edge 408-B of the potential touch event 402-A includes at least three distilled values 404-D, 404-E, and 404-F, which results in a decreased chaos metric. In contrast, referring to FIG. 4B, a falling edge 423 of the potential touch event 422-A includes a single distilled value 424, which results in an increased chaos metric.

In some implementations, in determining whether the chaos metric satisfies the chaos criterion (610), the processing device compares the number of scans in the falling edge of each peak in the set with a threshold number of scans. For example, referring again to FIG. 4A, the processing device may compare the three scans (e.g., distilled values 404-D, 404-E, and 404-F) in the falling edge 408-B of the potential touch event 402-A with the threshold number of scans. If the number of scans in the falling edge of a respective peak satisfies the threshold number of scans, then the respective peak does not satisfy the chaos criterion and the processing device associates the respective peak (e.g., peak 406-A of potential touch event 402-A) with a touch (e.g., a touch generally includes three scans on a falling edge of a potential touch event). If the number of scans in the falling edge of a respective peak does not satisfy the threshold number of scans, then the respective peak satisfies the chaos criterion and the processing device associates the respective peak with a false touch (e.g., water, sweat spray, etc.). Although three scans are discussed above with reference to the threshold number of scans, any number of scans can be used for the threshold number of scans. Evaluating rising and falling edges of peaks is discussed in further detail above with reference to FIGS. 4A-4B.

Because FIG. 4B illustrates water contacting the touch-sensitive display, the rising edge 423 is the same as the falling edge 423 (i.e., there is a negligible amount of time between the rising edge and the falling edge). The processing device may recognize (e.g., using a water detection algorithm) this lack of time between the rising and falling edges when determining whether the metric satisfies the chaos criterion. In some implementations, if an amount of time between the rising and falling edges of a potential touch event is below a threshold amount of time, then the processing device associates the potential touch event with a false touch. The reason being that a human touch generally takes at least a certain amount of time from start to finish. Although the potential touch events in FIGS. 4B and 5B are illustrated as vertical lines, one skilled in the art will appreciate that water based touch events may in some circumstances have some amount of time between the rising and falling edges.

In some implementations, one of the characteristic values is uniformity of rising edge slopes. Accordingly, in some implementations, to determine the chaos metric for the set of peaks (608), the processing device compares a slope of a rising edge of each peak in the set. For example, the processing device may determine the slope of the rising edge for a respective peak by comparing two distilled values (e.g., determine slope of the line between distilled values 404-A and 404-B). The processing device may set the chaos metric in accordance with a degree of uniformity between rising edges (e.g., a high degree of uniformity in the rising edges results in a decrease of the chaos metric). For example, Referring to FIG. 4A, slope of rising edge 408-A is substantially similar to a slope of rising edge 410-A (e.g., a high degree of uniformity).

In some implementations, in determining whether the chaos metric satisfies the chaos criterion (610), the processing device determines whether the degree of uniformity in rising edge slopes does not satisfy a uniformity threshold. In the examples provided, FIGS. 4A and 4B both have high degrees of uniformity, albeit in different forms. As such, for these examples, the processing device would determine that the degrees of uniformity shown in FIGS. 4A-4B both satisfy the uniformity threshold. Consequently, the chaos criterion would not be satisfied. This is problematic because FIG. 4B illustrates water spray contacting the touch-sensitive display. Accordingly, in some implementations, the processing device uses two or more characteristic values in determining the chaos metric and when determining whether the chaos metric satisfies the chaos criterion. Moreover, other water interactions with the touch-sensitive display may result in non-uniform rising edge slopes. Thus, uniformity of rising edge slopes from peak to peak can be a useful tool to detect false touches caused by water, depending on the circumstances.

In some implementations, one of the characteristic values is uniformity of falling edge slopes. Accordingly, in some implementations, to determine the chaos metric for the set of peaks (608), the processing device compares a slope of a falling edge of each peak in the set. The processing device may set the chaos metric in accordance with a degree of uniformity between falling edges (e.g., a high degree of uniformity in the falling edges results in a decrease of the chaos metric). Referring to FIG. 4A, slope of falling edge 408-B is substantially similar to a slope of falling edge 410-B. In some implementations, in determining whether the chaos metric satisfies the chaos criterion (610), the processing device determines whether the degree of uniformity in falling edge slopes does not satisfy a uniformity threshold (see discussion above regarding uniformity of rising edge slopes).

Although slope is discussed above with regards to uniformity of rising and falling edges, other characteristics of the rising and falling edges may be evaluated. For example, uniformity of the number of scans in the rising and falling edges may also be considered, either separately, or in combination with the slope determination.

In some implementations, one of the characteristic values is spacing/location of peaks in the set. Accordingly, in some implementations, to determine the chaos metric for the set of peaks (608), the processing device (i) determines a point in time, during the time window, in which each peak in the set occurred and (ii) determines a difference in time between each peak in the set. In some implementations, the processing device determines differences in time between adjacent peaks in the set. For example, referring to FIG. 5A, peak 406-A occurred at time 1 (t1) and peak 406-B occurred at t2, and therefore the difference in time between the two peaks is A. This process is repeated for each peak in the set. In some implementations, the processing device determines differences in time between all peaks in the set (e.g., difference between t1 and t3, t1 and t4, and so on). In some implementations, the processing device aggregates the determined differences in time and sets the chaos metric in accordance with the aggregation.

In some implementations, the chaos metric for the set of peaks is based on a degree of the difference in time between each peak in the set. For example, referring again to FIG. 5A, a degree of the difference in time between each peak in the set is minimal as the distribution of the peaks is uniform (e.g., difference between t1 and t2 is A, and difference between t2 and t3 is approximately A). Such a result can be expected when a user is, e.g., typing a message, because his or her typing cadence is expected to be substantially uniform when typing the message. In contrast, referring to FIG. 5B, a degree of the difference in time between each peak in the set is substantial because the distribution of the peaks is erratic (e.g., difference between t1 and t2 is Y, and difference between t2 and t3 is not approximate Y, but is instead Z). Such a result can be expected when water (e.g., spray, droplets, puddles, rivulets, trails, condensation, etc.) contacts the touch-sensitive display. Accordingly, the chaos metric for the set of peaks in FIG. 5A would be less than the chaos metric for the set of peaks in FIG. 5B.

In some implementations, the processing device determines an implied acceleration between peaks using the differences in time between adjacent peaks in the set. An acceleration between peaks (e.g., peak spacing decreases over time), at least in some circumstances, corresponds to water contacting the touch-sensitive display. For example, as water builds-up on the touch-sensitive display, spacing between peaks may decrease and magnitudes of peaks may also increase over time. In some implementations, a water detection algorithm is triggered in response to detecting an implied acceleration between peaks in the set.

In some implementations, if the chaos metric does not satisfy the chaos criterion (e.g., degree of chaos is minimal) (610—No), the processing device processes (612) the response data captured during the time window. For example, referring to FIG. 4A, the processing device processes the five sequential touches (e.g., the word "Field" is processed).

In some implementations, if the chaos metric satisfies the chaos criterion (e.g., degree of chaos is great) (610—Yes), the processing device rejects (614) at least some of the response data captured during the time window as representing at least one false touch. For example, referring to FIG. 4B, the processing device rejects one or more peaks in the set of peaks 426-A, 426-B, 426-C, 426-D, 426-E.

Alternatively or in addition, in some implementations, if the chaos metric satisfies the chaos criterion (610—Yes), the processing device rejects (616) response data captured during one or more subsequent scans of the touch-sensitive array. In some implementations, the rejected response data satisfies a touch threshold. For example, referring to FIG. 4B, the set of peaks 426-A, 426-B, 426-C, 426-D, 426-E where distilled from the plurality of scans, and the peak 428 is distilled from a subsequent scan. As such, the processing device rejects response data associated with the peak 428, even though the peak 428 satisfies the response threshold 430. In doing so, the processing device assumes that the peak 428 resulted from the chaotic response data from the plurality of scans (e.g., the peak 428 may have resulted from water build-up on the touch-sensitive display).

In some implementations, the processing device classifies each respective scan of the plurality of scans as either a first interaction type or a second interaction type, based at least in part on the response data captured during the respective scan. Each individual classification represents a single frame (i.e., an image) of a potential touch event. The first interaction type is associated with a valid touch (T) and the second interaction type is associated with a false touch (W). In some implementations, the processing device compares the response data for each respective scan with a plurality of response templates. For example, a first response template may illustrate response data typical of a valid touch and a second response template may illustrate response data typical of a false touch, e.g., one caused by water. In some implementations, the first response template may include magnitudes of typical electrode responses caused by a finger touch and the second response template may include magnitudes of typical electrode responses caused by water.

Figure 7A:
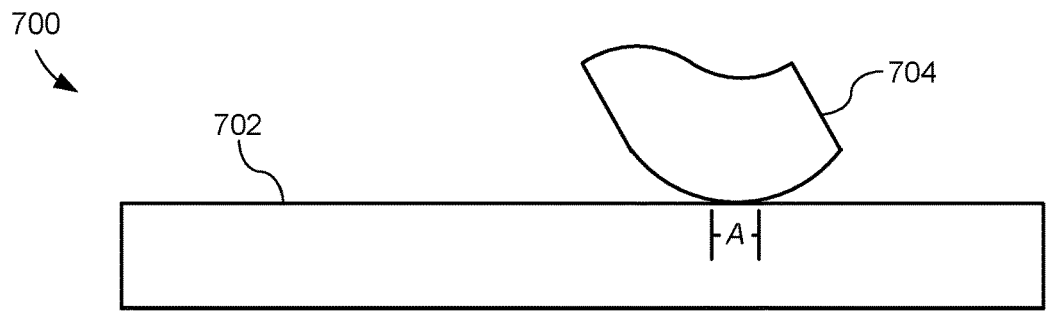
FIGS. 7A-7B illustrate potential touch events detected on a touch-sensitive display, in accordance with some implementations.
Figure 7A:
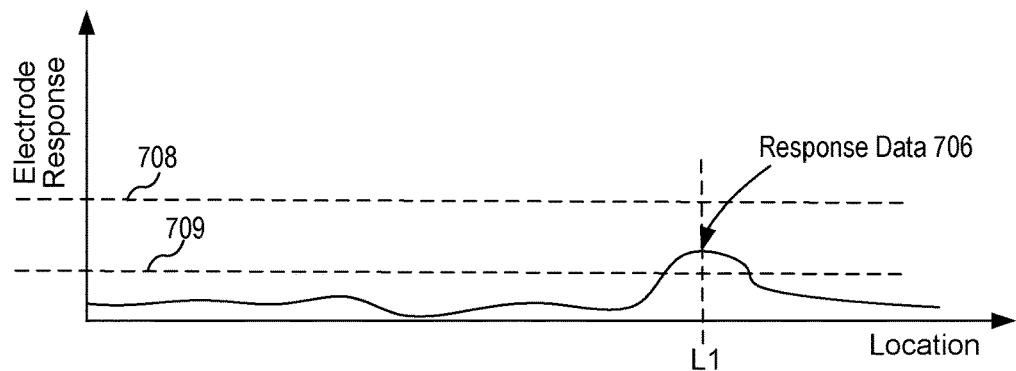

For example, FIG. 7A illustrates a first scan 700 of the plurality of scans in which a touch object 704 (e.g., a user's finger) is partially contacting the touch-sensitive array 702 (e.g., the fingertip is contacting the touch-sensitive array 702). The response data 706 associated with the touch object 704 does not satisfy a detection threshold 708 for the first response template and instead satisfies a detection threshold 709 for the second response template. As such, the processing device classifies the first scan 700 as the second interaction type (i.e., a false touch) in view of the plurality of response templates. This result, viewed in isolation, is misleading because a user's finger is actually involved. Accordingly, the processing device evaluates response data from other scans in the plurality of scans (i.e., the result of the first scan is simply a first image of a sequence of images).

Figure 7B:
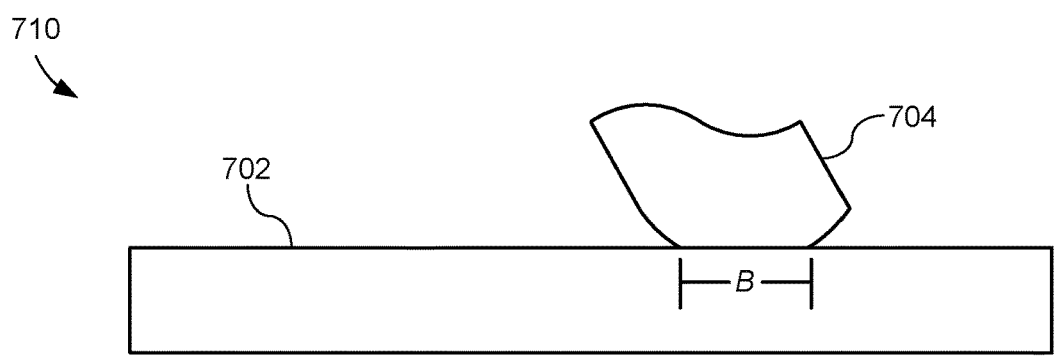
Figure 7B:
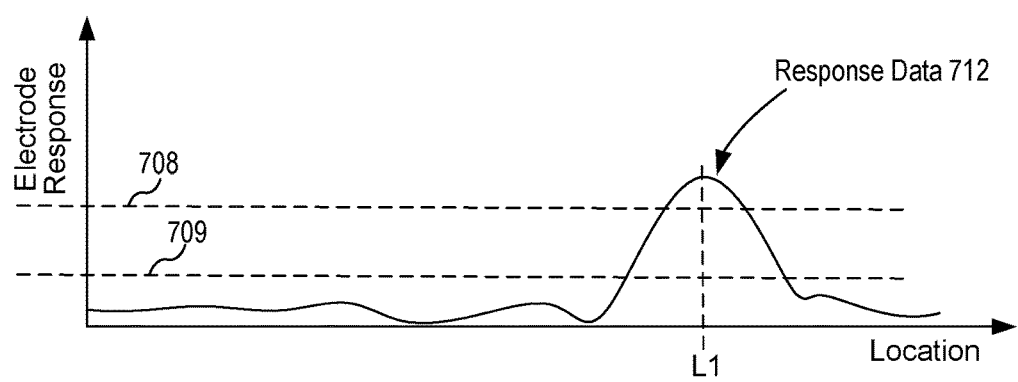

Continuing, FIG. 7B illustrates a second scan 710 of the plurality of scans in which the touch object 704 increases contact with the touch-sensitive array 702 (e.g., larger portion of the finger is contacting the touch-sensitive array 702). The response data 712 associated with the touch object 704 satisfies the detection threshold 708 for the first response template. As such, the processing device may classify the second scan 710 as the first interaction type (i.e., a touch). Although not shown, the processing device may evaluate additional scans of the plurality of scans and may determine an overall pattern for the plurality of scans. In doing so, the processing device strings together the results from the individual scans to create a series of images. For example, for FIGS. 7A-7B, the processing device may classify the two scans as water (W) and valid touch (T). The processing device would proceed to classify the additional scans in the plurality of scans until a threshold number of classifications is reached. For example, the overall pattern may include (W), (T), (W/T), . . . (W/T), depending on the circumstances.

In some implementations, the first and seconds scans may be sequential scans. In some implementations, the first and second scans are not sequential scans, but the second scan is nonetheless subsequent to the first scan. In some implementations, the touch-sensitive device scans the touch-sensitive array at a typical, but not limited to, rate between 50 and 150 Hz.

In some implementations, the first and second response templates may include values for other parameters. For example, the first response template may include an amount (or groups) of sensor electrodes that are typically activated by finger touches and the second response template may include an amount (or groups) of sensor electrodes that are typically activated by false touches. In some implementations, the second response template includes specific configurations for different types of water interactions (e.g., spray, droplets, puddles, rivulets, trails, or condensation). For example, referring to FIG. 7A, an amount of sensor electrodes activated by the touch object 704 is "A," which the processing device may compare to typical amounts (i.e., predefined amounts) of the first response template and the second response template. Because the user's fingertip is only contacting the touch-sensitive display, an amount of sensor electrodes activated is likely less than an amount of sensor electrodes that are typically activated by finger touches. As such, the processing device may classify the first scan 700 as the second interaction type (i.e., a false touch). Now, referring to FIG. 7B, an amount of sensor electrodes activated by the touch object 704 is "B," which the processing device may compare to typical amounts of the first response template and the second response template. As shown, "B" is substantially larger than "A" because a larger portion of the finger is contacting the touch-sensitive array 702. As such, the processing device may classify the second scan 710 as the first interaction type (i.e., a touch), assuming the first response template is satisfied.

In another example, several distinct groups of sensor electrodes may be activated. In some circumstances, distinct groups of sensor electrodes may be activated by a user (e.g., during a multi-touch operation). In other circumstances, distinct groups of sensor electrodes may be activated by water spray. Generally, water spray activates more groups of sensor electrodes than groups of sensor electrodes activated during a multi-touch operation (e.g., two to three distinct groups may be activated during a multi-touch operation). Based on this, the processing device may compare a number of activated groups with the first response template and the second response template.

In some implementations, the processing device may use a combination of parameters from the first and second response templates to determine an interaction type for a given scan. For example, the processing device may (i) determine if the response data satisfies a detection threshold and (ii) determine an amount (or groups) of sensor electrodes currently activated. Other combinations are also possible.

In some implementations, the processing device determines an additional metric (also referred to herein as a second metric and/or a shape metric) for the plurality of scans based on the overall pattern of the first and second interaction types. In addition, in some implementations, the processing device determines whether the shape metric satisfies a shape criterion. For example, if the overall pattern includes a threshold amount of first interaction types, then the shape metric may indicate that the plurality of scans are associated with a valid touch. As such, the shape metric would not satisfy the shape criterion. Conversely, if the overall pattern does not include the threshold amount of first interaction types (or the overall pattern includes a threshold amount of second interaction types), then the shape metric may indicate that the plurality of scans are associated with a false touch. As such, the shape metric would satisfy the shape criterion. By evaluating a sequence of scans, as opposed to viewing results from scans in isolation, the processing device views response data over time.

In some implementations, in response to determining that the shape metric satisfies the shape criterion, the processing device rejects response data captured during at least some of the plurality of scans as representing at least one false touch. Alternatively or in addition, in response to determining that the shape metric satisfies the shape criterion, the processing device rejects response data captured during one or more subsequent scans of the touch-sensitive array. In some implementations, the rejected response data satisfies a touch threshold.

In some implementations, the processing device uses a combination of the chaos metric and the shape metric in rejecting (or processing) response data.

In some circumstances, a set of peaks corresponds to one or more touches on an edge region of the touch-sensitive display. In these circumstances, however, a magnitude of each peak in the set may resemble water-based touch events rather than a touch (e.g., a portion of the user's finger may not actually be contacting the touch-sensitive display and may instead by contacting a housing of the touch-sensitive device). In other words, the magnitude of each peak in the set does not satisfy the response threshold, even though an actual touch is involved. As such, the touch-sensitive device rejects the response data for the touch(es) on the edge region of the touch-sensitive display. The phenomenon is particularly pronounced when the touch-sensitive device includes a condensed touch-sensitive display, such as the touch-sensitive displays used in smartwatches and fitness watches/devices.

Figure 8A:
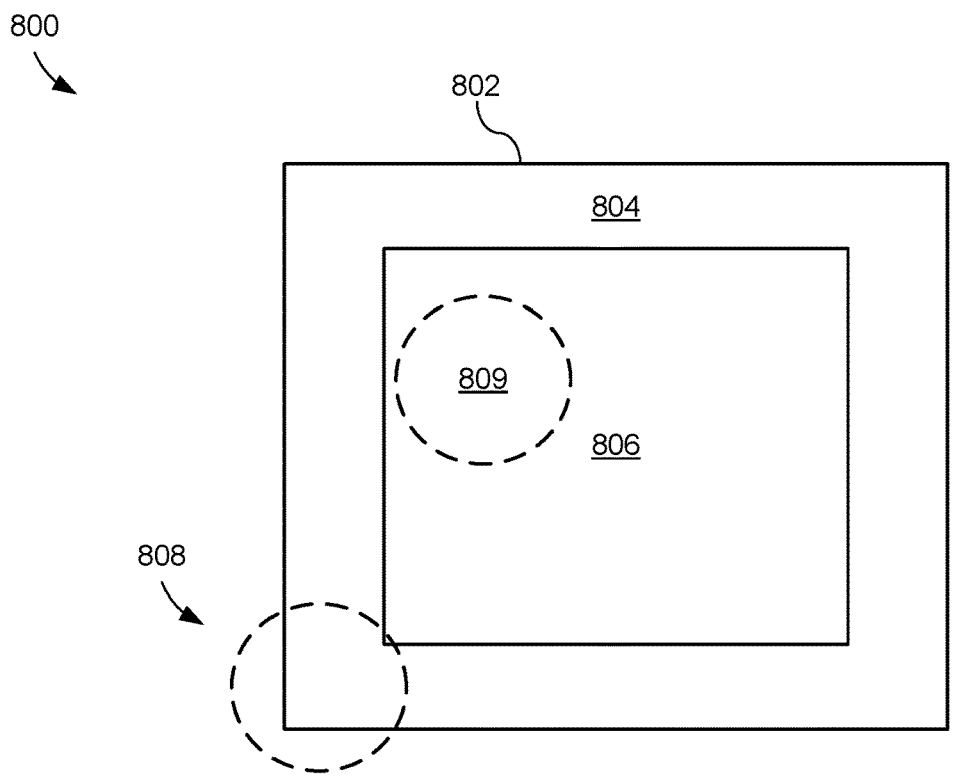
FIGS. 8A-8B illustrate a touch event detected on an edge region of a touch-sensitive display, in accordance with some implementations.
Figure 8B:
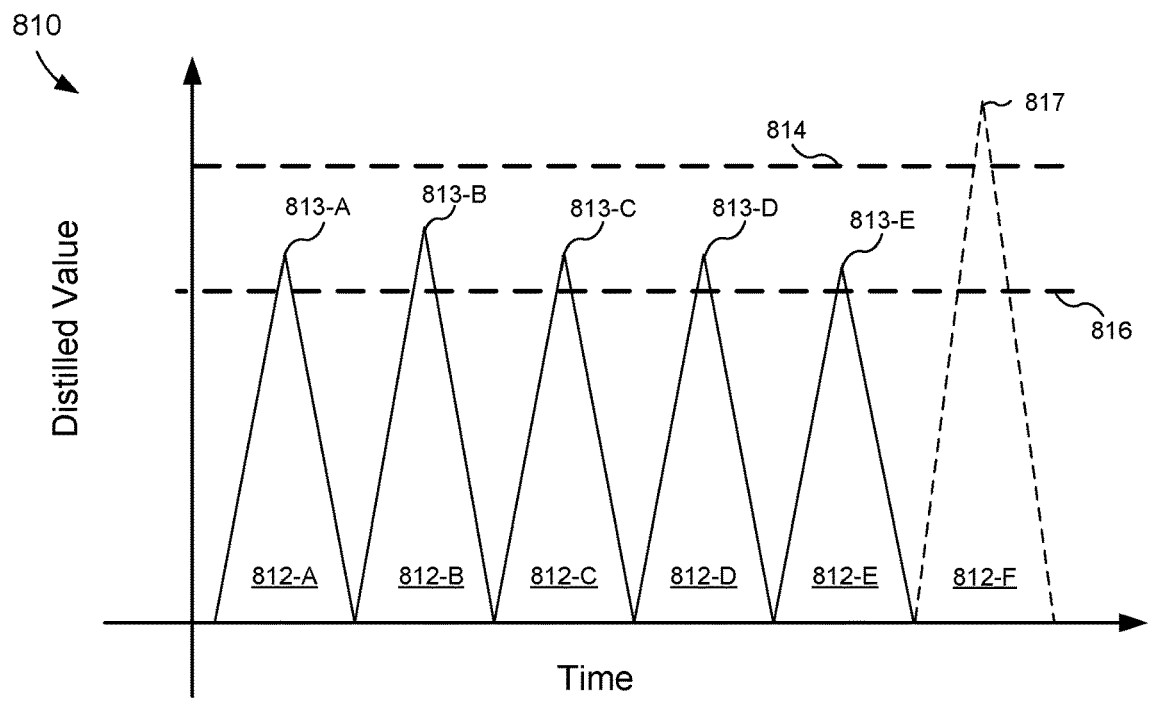

To resolve this problem, in some implementations, the processing device implements a process for touch detection on edge regions of touch-sensitive displays, which is shown in FIGS. 8A-8B. FIG. 8A illustrates a touch-sensitive display 800 of a touch-sensitive device (e.g., a smartwatch). The process includes performing a plurality of scans of a touch-sensitive array 802 of the touch-sensitive display 800 to capture response data for a touch 808. Additionally, the processing device determines that the response data captured from each of the plurality of scans corresponds to an edge region 804 of the touch-sensitive array 802 (as opposed to a central region 806 of the touch-sensitive array 802). For example, touch 808 is shown in the edge region 804. Of particular interest, the touch 808 extends off the touch-sensitive array 802 and onto a housing (not shown) of the touch-sensitive device (i.e., the touch 808 is a partial touch). Accordingly, the captured response data for the touch 808 will reflect the partial nature of the touch 808 (i.e., the captured response data does not satisfy a response threshold).

Thereafter, the processing device performs the distilling, identifying, and determining steps described above (e.g., steps 604, 606, and 608, FIG. 6), which results in the processing device determining a chaos metric for the set of peaks based on a plurality of characteristic values associated with each peak in the set. For example, to determine the chaos metric for the set of peaks, the processing device (i) identifies a magnitude of each peak in the set and (ii) compares the magnitude of each peak in the set with a response threshold. As shown in FIG. 8B, the magnitudes 813-A-813-E for the set of peaks 812-A-812-E do not satisfy the response threshold 814. As such, the chaos metric associated with the set of peaks in FIG. 8B satisfies the chaos criterion, as described in further detail above with reference to FIG. 6.

For example, a subsequent touch event 809 in the central portion 806 of the touch-sensitive array 802 is rejected, even though a magnitude 817 of a peak 812-F for the subsequent touch event 809 satisfies the response threshold 814. The reason being that the set of peaks, which now includes peaks 812-A-812-F, includes five peaks that do not satisfy the response threshold 814 and only one peak that does satisfy the response threshold 814. As such, the set of peaks 812-A-812-F is still deemed to be chaotic (for ease of discussion, assume that when three or more peaks in the set of peaks do not satisfy the response threshold, the chaos metric associated with the set of peaks satisfies the chaos criterion, i.e., the set of peaks is chaotic).

Accordingly, to resolve the problem highlighted above, the process further includes removing some of the peaks from the set of peaks. For example, to ensure that the subsequent touch event 809 is processed, the processing device removes peaks 812-A-812-C from the set of peaks. In this way, the set of peaks includes two peaks 812-D and 812-E that do not satisfy the response threshold, i.e., the set of peaks is not chaotic. As such, if a subsequent peak does not satisfy the response threshold 814, then the set of peaks is deemed to be chaotic. However, if the subsequent peak does satisfy the response threshold 814, then the set of peaks is still not chaotic, and therefore, the subsequent response is processed by the processing device. In this way, the subsequent touch event 809 in the central portion 806 of the touch-sensitive array 802 is not rejected.

In some implementations, regions of the touch-sensitive array 802 have different corresponding response thresholds (i.e., a response threshold for a first region of the touch-sensitive array 802 differs from a response threshold for a second region of the touch-sensitive array 802). For example, a response threshold 816 for the edge region 804 of the touch-sensitive array 802 may differ from (e.g., is less than) the response threshold 814 for the central region 806 of the touch-sensitive array 802. In this way, the processing device is able to compensate for the partial nature of touch events located in the edge region 804 of the touch-sensitive array 802.

In some implementations, a gesture (e.g., a swipe gesture) triggers the process described above with reference to FIGS. 8A-8B. For example, a gesture that begins in the edge region 804 of the touch-sensitive array 802 may result in a set of peaks having a chaos metric that satisfies the chaos criterion. Accordingly, in some implementations, when a swipe gesture that begins in the edge region 804 of the touch-sensitive array 802 is detected, one or more (or perhaps all) peaks in the set are removed. In this way, subsequent portions of the swipe gesture are processed.

In some implementations, a method for the edge detection process described above includes, at a touch-sensitive device having one or more processors and a touch-sensitive array that includes a plurality of sensor electrodes, performing a plurality of scans of the touch-sensitive array to capture response data for each of the plurality of scans, and determining whether the captured response data from each of the plurality of scans corresponds to an edge region of the touch-sensitive array (e.g., the user's finger is partially on the touch-sensitive display and partially off the touch-sensitive display, as shown by touch 808, FIG. 8A). The method further includes (i) distilling a value for each respective scan of the plurality of scans from the response data captured during the respective scan; (ii) identifying a set of peaks from the distilled values, each peak having a plurality of characteristic values; and (iii) determining a metric for the set of peaks based on the plurality of characteristic values associated with each peak in the set. In some implementations, determining the metric for the set of peaks based on the plurality of characteristic values comprises determining a magnitude of each peak in the set and comparing the magnitude of each peak in the set with a threshold (e.g., response threshold 814, FIG. 8B).

The method further comprises, in response to determining that the metric satisfies a criterion (e.g., a predefined number of magnitudes do not satisfy the threshold, and therefore, the set of peaks is chaotic), and in response to determining that the captured response data for each of the plurality of scans corresponds to the edge region of the touch-sensitive array: (i) removing a predefined number of peaks from the set of peaks so that the metric no longer satisfies the criterion (e.g., if the set includes a five peaks, then three peaks are removed from the set), (ii) performing at least one scan of the touch-sensitive array to capture response data for the at least one scan, and (iii) determining a subsequent metric for the at least one scan (in some implementations, this requires performing the distilling and identifying steps again).

In some implementations, in response to determining that the subsequent metric for the at least one scan satisfies the threshold (e.g., a magnitude of peak 812-F satisfies the response threshold 814, FIG. 8B), the method further includes processing the response data for the at least one subsequent scan (e.g., the set of peaks is not chaotic). Alternatively, in some implementations, in response to determining that the subsequent metric for the at least one scan does not satisfy the response threshold, the method further includes rejecting at least some of the response data for the plurality of scans and the subsequent scan (e.g., the set of peaks is chaotic).

In some implementations, when the captured response data for the at least one scan corresponds to the edge region of the touch-sensitive array, then the removal process is repeated. In this way, each subsequent scan may result in the set of peaks being chaotic or not chaotic.

It will be understood that, although the terms "first," "second," etc. may be used herein to describe various elements, these elements should not be limited by these terms. These terms are only used to distinguish one element from another. For example, a first peak could be termed a second peak, and, similarly, a second peak could be termed a first peak, which changing the meaning of the description, so long as all occurrences of the "first peak" are renamed consistently and all occurrences of the second peak are renamed consistently. The first peak and the second peak are both peaks, but they are not the same peak.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of rejecting false touches, comprising:
at a touch-sensitive device having one or more processors and a touch-sensitive array that includes a plurality of sensor electrodes:
performing a plurality of scans of the touch-sensitive array during a time window, including capturing response data from each of the plurality of scans;
distilling a value for each respective scan of the plurality of scans from the response data captured during the respective scan;
identifying a set of peaks from the distilled values, each peak in the set of peaks having a plurality of characteristic values;
determining a magnitude of each peak in the set of peaks based on the plurality of characteristic values associated with each peak in the set of peaks;
comparing the magnitude of each peak in the set of peaks with a threshold;
determining whether a predefined number of the magnitudes do not satisfy the threshold; and
in response to determining that the predefined number of the magnitudes do not satisfy the threshold, rejecting at least some of the response data captured during the time window as representing at least one false touch.

2. The method of claim 1, further comprising, at the touch-sensitive device:
classifying each respective scan of the plurality of scans as either a first interaction type or a second interaction type, based at least in part on the response data captured during the respective scan;
determining a metric for the plurality of scans based on an overall pattern of the first interaction type and the second interaction type;
determining whether the metric satisfies a criterion; and
in response to determining that the metric satisfies the criterion, rejecting at least some of the response data captured during the time window as representing at least one false touch.

3. The method of claim 2, wherein classifying each respective scan comprises comparing the response data with a plurality of response templates.

4. The method of claim 2, wherein:
the first interaction type is a valid touch; and
the second interaction type is a false touch.

5. The method of claim 1, wherein distilling the value for each respective scan of the plurality of scans comprises aggregating the response data captured during the respective scan for at least a subset of the plurality of sensor electrodes.

6. The method of claim 5, wherein aggregating the response data captured during the respective scan comprises determining an absolute sum of the response data for each sensor electrode in the subset.

7. The method of claim 1, wherein the time window corresponds to a predetermined number of scans.

8. The method of claim 7, wherein performing the plurality of scans comprises scanning the touch-sensitive array at a constant rate.

9. The method of claim 1, wherein the at least one false touch is caused by a drop, puddle, spray, rivulet, trail, or condensation of water.

10. The method of claim 1, further comprising, at the touch-sensitive device:
in response to determining that the predefined number of the magnitudes do not satisfy the threshold, rejecting response data captured during one or more subsequent scans of the touch-sensitive array, wherein the rejected response data satisfies a touch threshold.

11. The method of claim 1, wherein the plurality of characteristic values includes one or more of: slope of rising edge, slope of falling edge, peak magnitude, variance in peak magnitude, spacing of peaks, uniformity of rising edge slopes, uniformity of falling edge slopes, implied acceleration between peaks.

12. A method of rejecting false touches, comprising:
at a touch-sensitive device having one or more processors and a touch-sensitive array that includes a plurality of sensor electrodes:
performing a plurality of scans of the touch-sensitive array during a time window, including capturing response data from each of the plurality of scans;
distilling a value for each respective scan of the plurality of scans from the response data captured during the respective scan;
identifying a set of peaks from the distilled values, each peak in the set of peaks having a plurality of characteristic values;
determining variances in peak magnitudes in the set peaks based on the plurality of characteristic values associated with each peak in the set of peaks;
determining whether the variances in peak magnitudes in the set of peaks satisfy a variance threshold; and
in response to determining that the variances in peak magnitudes in the set of peaks satisfy the variance threshold, rejecting at least some of the response data captured during the time window as representing at least one false touch.

13. The method of claim 12, wherein the at least one false touch is caused by a drop, puddle, spray, rivulet, trail, or condensation of water.

14. The method of claim 12, further comprising, at the touch-sensitive device:
in response to determining that the variances in peak magnitudes in the set of peaks satisfy the variance threshold, rejecting response data captured during one or more subsequent scans of the touch-sensitive array, wherein the rejected response data satisfies a touch threshold.

15. A method of rejecting false touches, comprising:
at a touch-sensitive device having one or more processors and a touch-sensitive array that includes a plurality of sensor electrodes:
performing a plurality of scans of the touch-sensitive array during a time window, including capturing response data from each of the plurality of scans;
distilling a value for each respective scan of the plurality of scans from the response data captured during the respective scan;
identifying a set of peaks from the distilled values, each peak in the set of peaks having a plurality of characteristic values;

determining a slope of an edge for each peak in the set of peaks based on the plurality of characteristic values associated with each peak in the set of peaks;

for the set of peaks:
- determining, based on the slope of the edge for each peak in the set of peaks, a uniformity of slopes of corresponding rising edges or falling edges;
- determining whether a degree of the uniformity of slopes of the corresponding rising edges or falling edges satisfies a uniformity threshold; and
- in response to determining that the degree of the uniformity of slopes of the corresponding rising edges or falling edges does not satisfy the uniformity threshold, rejecting at least some of the response data captured during the time window as representing at least one false touch.

16. The method of claim 15, wherein:

the edge for each peak in the set of peaks is a rising edge; and determining the slope of the edge for each peak in the set of peaks comprises determining a number of scans in the rising edge peak.

17. The method of claim 15, wherein:

the edge for each peak in the set of peaks is a falling edge; and determining the slope of the edge for each peak in the set of peaks comprises determining a number of scans in the falling edge peak.

18. The method of claim 15, wherein the at least one false touch is caused by a drop, puddle, spray, rivulet, trail, or condensation of water.

\* \* \* \* \*